United States Patent Office 3,005,385
Patented Oct. 24, 1961

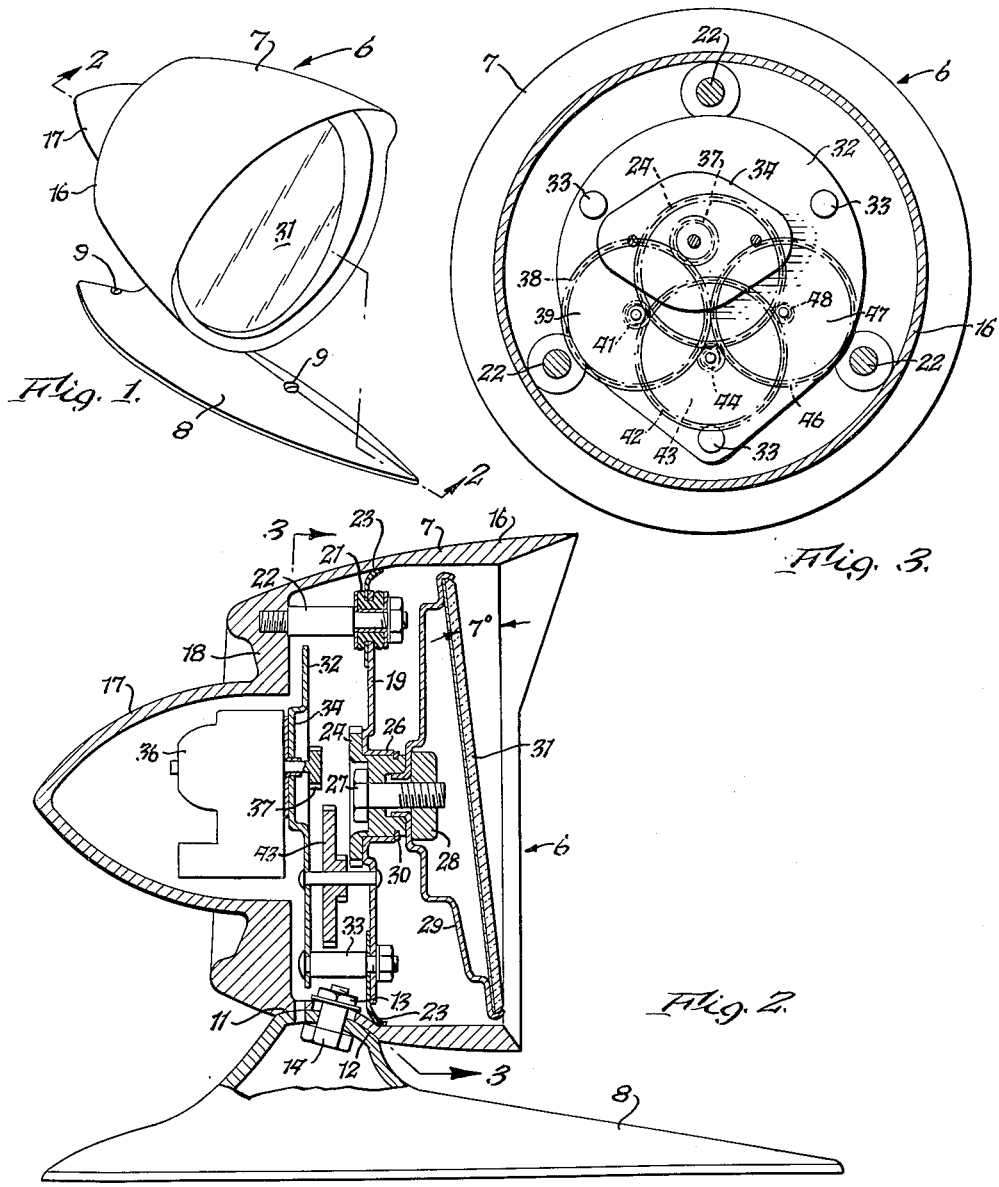

3,005,385
REMOTE CONTROLLED REAR-VISION MIRROR ALLOWING ACCURATE AIMING
Lynn C. Meade, Buffalo, and William Gray, Jr., Lake View, N.Y., assignors to Standard Mirror Company, Inc., Buffalo, N.Y., a corporation of New York
Filed Dec. 4, 1957, Ser. No. 700,590
5 Claims. (Cl. 88—98)

This invention relates to rear-vision mirrors for use on motor vehicles, and more particularly to a remote controlled rear-vision mirror.

The rear vision mirror of the invention is of the type that is normally mounted on the exterior of a motor vehicle, and represents an improvement over such mirrors as may be considered prior art, in several important respects, namely:

(a) it has provision for allowing more accurate aiming with less possibility of over-shooting the desired mirror setting;

(b) it has provision for reducing mirror vibration by means of an insulated, high inertia, suspended mass arrangement;

(c) it has provision for effectively sealing the entire drive mechanism against moisture and dirt.

An object of this invention is to provide a remote controlled rear vision mirror which allows for more accurate aiming with less possibility of over-shooting the desired mirror setting.

Another object of the invention is to provide a remote controlled rear vision mirror in which vibration is reduced by means of an insulated, high inertia, suspended mass arrangement.

Still another object of the invention is to provide a remote controlled rear vision mirror having provision for sealing the entire drive mechanism against moisture and dirt.

These and further objects and features of the invention will become more apparent from the following description and accompanying drawing in which:

FIG. 1 is a perspective view of a remote control rear vision mirror embodying the principles of the invention;

FIG. 2 is an enlarged section view as seen from line 2—2 in FIG. 1; and

FIG. 3 is a section view as seen from line 3—3 in FIG. 2.

Referring now to the drawing, the numeral 6 refers to a rear vision mirror which includes a housing 7, and a base piece 8, the latter being formed for easy mounting by fastening means, such as screws 9 to the upper surface of a front fender (not shown) of a motor vehicle. The base piece has a rounded portion 11 which slidingly engages a recess portion 12 of the housing 7, whereby the latter may be swivelly mounted to provide mirror adjustment if required upon installation. A clamping bolt 13 and nut 14 may be used to secure the housing in adjusted position upon the base piece. The housing 7 has a generally conically shaped exterior with a mirror and gear enclosure portion 16, and a motor enclosure portion 17, the two portions being interconnected by a radially disposed joining wall 18.

A mirror support plate 19 is positioned within the enclosure portion 16, and has three soft rubber grommets 21, which are mounted upon the ends of studs 22 threaded into the joining wall 18. A sealing means, in the form of a flexible gasket ring 23, is positioned upon the support plate 19, and extends into snug engagement with the inner surface of the enclosure portion 16. A gear 24, having 95 teeth, is rotatably supported in a flanged opening 26 formed integral and at the center of the support plate 19, while a shaft in the form of a bolt 27 and nut 28 secure the center portion of a mirror casing 29 to the gear 24. A snap ring 30 restricts rearward axial movement of the gear 24. The casing 29 is arranged to fixedly secure a flat circular mirror 31, whereby the axis of the mirror is at an angle of approximately 7° relative to the axis of the bolt 27.

A motor support plate 32 is fixed in parallel manner to the mirror support plate 19 by a plurality of stud means 33. The motor support plate has a rearwardly dished portion 34, on the back of which is secured a motor 36, located within the motor enclosure portion 17. Electrical wires (not shown) for the motor 36, are enclosed within the housing 7, and pass through the swivel connection between the housing and base piece 8, for connection to a control switch. The motor 36 has a 27 tooth pinion 37 on the end of its shaft, which meshes with teeth 38 of a composite gear 39. The latter has a pinion 41, which engages teeth 42 of a composite gear 43. Gear 43 has a pinion gear 44, which engages teeth 46 of a composite gear 47. The latter has a pinion gear 48, which mesh with the teeth of gear 24. The gears 39, 43 and 47 each have 95 teeth, while the pinions 41, 44 and 48 each have 18 teeth. In such manner, a speed reduction of approximately 511 to 1 will be realized between the motor pinion 37 and the flange gear 24, thereby making for a very slow revolution of the mirror 31, whereby more accurate mirror aiming is assured since there will be less possibility of over-shooting the desired mirror setting.

It will be seen that the mechanism above described, will eliminate or reduce mirror vibration because the entire weight of the mirror 31, motor 36, and gear arrangement are supported upon a single plate, viz. mirror plate 19, which is mounted, or suspended upon a plurality of soft rubber grommets 21. Thus an insulated, high inertia, suspended mass, remotely controlled mirror arrangement is provided which is practically free from vibration. In addition, it will be seen that the sealing means i.e., gasket 23, protects the motor and gear train against moisture and dirt.

The foregoing description has been given in detail without thought of limitation since the inventive principles involved are capable of assuming other physical embodiments without departing from the spirit of the invention and the scope of the appended claims.

What is claimed is:

1. A remote controlled rear vision mirror for an automobile or the like comprising a housing in the form of a cup-shaped hollow shell having its mouth in the form of a generally vertical opening on the side facing to the rear of the automobile with its rim surrounding the fore-and-aft axis of the housing, a generally vertical supporting plate arranged in said housing transversely of said axis in spaced relation to said opening and with its rim arranged in closely spaced relation to the interior face of said housing, means removably securing said supporting plate to said housing, a rotatable member journalled centrally in and extending through said supporting plate to rotate about a generally horizontal fore-and-aft axis, a mirror panel arranged transversely of said axes between said supporting plate and opening and operatively connected to said rotatable member with its reflective face at an angle other than 90° to said axis of rotation of said rotatable member, a generally vertical motor supporting plate arranged transversely of said axes in spaced relation to and on the side of said first supporting plate remote from said mirror panel, means securing said motor supporting plate exclusively to said first supporting plate, an electric motor in said housing on the side of said motor suporting plate remote from said mirror panel, means securing the body of said motor exclusively to said motor supporting plate, and a train of speed reducing gears and pinions arranged between and rotatably mounted on said plates and operatively connecting the shaft of said motor with said rotatable member to nutate said mirror panel slowly in response to energization of the motor until it reaches the desired position for the particular driver.

2. A remote controlled rear vision mirror as set forth in claim 1 wherein a sealing rim of flexible material is secured to project radially from said rim of said supporting plate into engagement with said interior face of said housing to provide a weather seal for the space in which said motor and train of gears and pinions is housed.

3. A remote controlled rear vision mirror for an automobile comprising a housing in the form of a cup-shaped hollow shell having its mouth in the form of a generally vertical opening on the side facing to the rear of the automobile with its rim surrounding the fore-and-aft axis of the housing, a generally vertical supporting plate arranged in said housing transversely of said axis in spaced relation to said opening and with its rim arranged in closely spaced relation to the interior face of said shell, a plurality of generally horizontal studs arranged in said housing and anchored therein at spaced intervals around said axis and projecting toward said opening, means removably securing the rim of said supporting plate to the outboard ends of said studs, a rotatable member journalled centrally in and extending through said supporting plate to rotate about a generally horizontal fore-and-aft axis, a mirror panel arranged transversely of said axes between said supporting plate and opening and operatively connected to said rotatable member with its reflective face arranged at an angle other than 90° to said axis of rotation of said rotatable member, a plurality of horizontal studs mounted on said supporting plate in spaced relation around said rim thereof and projecting away from said opening, a generally vertical motor supporting plate mounted on the outboard ends of said last studs, an electric motor in said housing on the side of said motor supporting plate remote from said mirror panel, means securing the body of said motor exclusively to said motor supporting plate, and a train of speed reducing gears and pinions arranged between and rotatably mounted on said plates and operatively connecting the shaft of said motor with said rotatable member to nutate said mirror panel slowly in response to energization of the motor until it reaches the desired position for the particular driver.

4. A remote controlled rear vision mirror as set forth in claim 3, wherein each of said first studs includes a soft rubber body at the outboard end thereof and supporting said first supporting plate to isolate said mirror from vibration and jars of said housing.

5. A remote controlled rear vision mirror for an automobile or the like, comprising a housing in the form of a cup-shaped hollow shell having its mouth in the form of a generally vertical opening on the side facing to the rear of the automobile with its rim surrounding the fore-and-aft axis of the housing, a generally vertical supporting plate arranged in said housing transversely of said axis in spaced relation to said opening and with its rim arranged in closely spaced relation to the interior face of said shell, means arranged at a plurality of places around said rim removably securing said supporting plate to said housing, a gear arranged generally concentric with said axis on the side of said supporting plate remote from said opening and having a hub journalled in and extending through said supporting panel, a mirror panel arranged transversely of said axis between said supporting plate and opening, means fixing said mirror panel to said hub with its reflective face arranged at an angle other than 90° to the axis of rotation of said hub, an electric motor in said housing on the side of said supporting plate remote from said mirror panel, means securing the body of said motor exclusively to said supporting plate, and a train of speed reducing gears and pinions rotatably supported by said supporting plate and operatively connecting the shaft of said motor to said gear to nutate said mirror panel slowly in response to energization of the motor until it reaches the desired position for the particular driver.

References Cited in the file of this patent

UNITED STATES PATENTS

| | | |
|---|---|---|
| 1,987,459 | Anchors | Jan. 8, 1935 |
| 2,439,294 | Hammond | Apr. 6, 1948 |
| 2,456,362 | Aves | Dec. 14, 1948 |
| 2,656,764 | Johnson | Oct. 27, 1953 |
| 2,664,029 | Higgins | Dec. 29, 1953 |
| 2,696,142 | Langford | Dec. 7, 1954 |
| 2,724,995 | Matner | Nov. 29, 1955 |
| 2,737,852 | Porter et al. | Mar. 13, 1956 |
| 2,791,939 | Malachowski | May 14, 1957 |
| 2,855,825 | Feder | Oct. 14, 1958 |
| 2,862,420 | Hazelroth | Dec. 2, 1958 |